United States Patent [19]

Bang

[11] Patent Number: 4,488,432
[45] Date of Patent: Dec. 18, 1984

[54] MEASURING CUP

[76] Inventor: Judith M. Bang, 5116 W. 60th St., Minneapolis, Minn. 55436

[21] Appl. No.: 505,959

[22] Filed: Jun. 20, 1983

[51] Int. Cl.³ .............................................. G01F 19/00
[52] U.S. Cl. ...................................... 73/429; 215/365
[58] Field of Search .................. 73/429, 426; 215/365, 215/366

[56] References Cited

U.S. PATENT DOCUMENTS

| 883,898 | 4/1908 | Moore | 73/426 X |
|---|---|---|---|
| 2,159,431 | 5/1939 | Dickeson | 73/165 |
| 2,527,348 | 10/1950 | Berkower | 73/429 |
| 2,630,014 | 3/1953 | Chester | 73/429 |
| 2,690,080 | 9/1954 | Rich | 73/429 |
| 2,839,928 | 6/1958 | Fohrman | 73/429 |
| 2,854,849 | 10/1958 | Setecka | 73/429 |
| 4,335,609 | 6/1982 | Saulsbury | 73/426 |

FOREIGN PATENT DOCUMENTS 223565  9/1942  Switzerland .......................... 73/429

Primary Examiner—Daniel M. Yasich
Attorney, Agent, or Firm—Kinney & Lange

[57] ABSTRACT

A measuring cup including a transparent open-ended cylinder and a metering piston mounted in the cylinder for longitudinal movement and rotational movement with respect to the cylinder. The piston includes an upper completely cylindrical measuring disc of diameter to contact the inner cylindrical surface of the cylinder. The piston also includes a lower interrupted guide disc in sufficient contacting relation to the inner surface of the cylinder to maintain the upper face of the upper disc at right angles to the axis of the cylinder. The piston includes an hourglass-shape spacer integral with both the upper and lower discs to fixedly space the discs from each other. The cylinder has a number of vertically spaced-apart metering piston positioning lugs extending inwardly from its inner cylindrical surface, and the lower guide disc is provided with slots in its outer periphery of size and shape to allow passage of the lower disc past the positioning lugs when the piston and cylinder are positioned to vertically align the lugs with the slots. By rotating the piston with respect to the cylinder, the lugs can be moved out of vertical alignment with the slots, and every lug, when it is in adjacent relationship to the lower disc, will prevent movement of the piston longitudinally of the cylinder when the disc comes to rest on the positioning lug.

13 Claims, 11 Drawing Figures

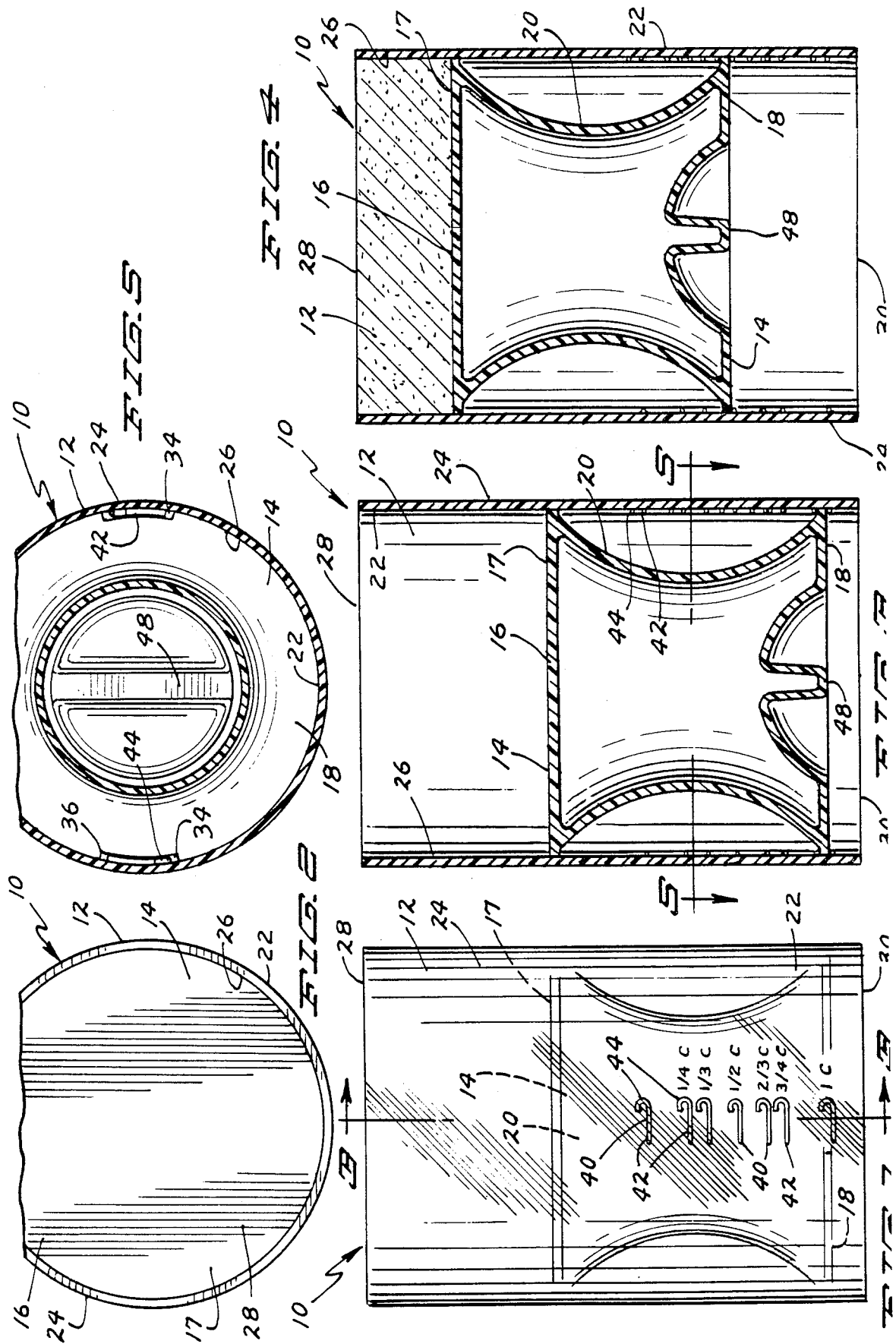

MEASURING CUP

BACKGROUND OF THE INVENTION

1. Field of the Invention

This invention has relation to adjustable measuring devices which can be adjusted to provide a finite number of different cup-shape volumes which can be filled with materials to precisely measure material quantities of those volumes. This invention relates to the measurement of materials to be used in cooking or for any other purpose where measured materials are needed, including, but not limited to, granular or powdered materials such as meals, sugar, flour, baking powder, lard and the like, but also for other forms of materials including thin or viscous, aqueous or oily liquids.

2. Description of the Prior Art

It is well known to provide measuring cups with adjustable bottoms to measure different quantities of materials. See the following patents:

U.S. Pat. No. 2,839,928 granted to S. F. Fohrman on June 24, 1958;

U.S. Pat. No. 2,527,348 granted to L. Berkower on Oct. 24, 1950;

U.S. Pat. No. 2,159,431 granted to Dickeson on May 23, 1939;

U.S. Pat. No. 2,630,014 granted to G. Chester on Mar. 3, 1953;

U.S. Pat. No. 883,898 granted to A. T. Moore on Apr. 7, 1908; and

U.S. Pat. No. 2,690,080 granted to J. W. Rich on Sept. 28, 1954.

Other devices have also been used to change the volume of a space for measuring material. See the following patent:

U.S. Pat. No. 2,854,849 granted to J. Setecka on Oct. 7, 1958.

Many if not all of these prior art structures can give accurate results as far as measuring a quantity of material such as shortening, for example, is concerned. However, all of them suffer from certain deficiencies.

For example, in U.S. Pat. No. 2,839,928 to Fohrman, there is disclosed a tubular, relatively hard and rigid outer cylinder open at both ends, and an inner substantially cylindrical one-piece piston member of relatively softer, flexible and radially compressible material. Both the tubular outer member or cylinder and the inner relatively softer, flexible and radiablly compressible one-piece inner member or piston have a "slight upward taper" in order to facilitate production by injection molding. Structures made according to this invention are believed to be still on the market; but they are difficult to deal with. The cylinder and piston cannot move freely and easily with respect to each other at all positions along the longitudinal dimension of the hard plastic cylinder, due to the variation in the inner diameter of the cylinder and the consequent differences in drag between movement of the top sealing edge of the inner member or piston as it is dragged along the interior cylinder wall. Further, there does not seem to be provided any way to get a physically fixed relationship of the inner member to the outer member for the purpose of insuring that the measurement is going to be precisely accurate each time it is made. Also, considerable "drag" must be provided even at the maximum diameter of the cylindrical outer member to insure that the pieces won't slide with respect to each other while measurements are being made with the head of the piston located in this area of maximum dimension.

The adjustable measuring cup of the Berkower patent, U.S. Pat. No. 2,527,348, seems to provide positive and finite volumes, by using the shank of a spoon 30 passing through diametrically paired apertures or stops 27 or 28 which are provided in the outer cylinder wall. These very apertures, however, leave places for spilled measured materials to gather and to build up, thus making the cup of Berkower very difficult to clean completely at each washing. Also making it very difficult to clean is the partition disc 18 which is situated approximately midway between the ends of the tube or cylinder. It is believed, for example, that use of the Berkower structure would not be permitted in certain food industries because of the difficulty in cleaning the cylinder portion of the measuring cup before and after use.

The patent to Dickeson, U.S. Pat. No. 2,159,431, presents a complicated spring and handle structure which certainly will pick up dirt in usage and will be very difficult to clean for that reason. However, the primary problem with the Dickeson structure is, probably, that there must be a longitudinally extending slot 2 extending vertically from the bottom to the top of the measuring cup.

Also provided with a slot which can discharge measured materials therethrough is the patent to Chester, U.S. Pat. No. 2,630,014. It likewise is not something which can easily be cleaned.

The patent to Moore, U.S. Pat. No. 883,898, is subject to the same difficulties as far as cleaning is concerned as those discussed above; as is the patent to Rich, U.S. Pat. No. 2,690,080.

The measuring scoop of Setecka, U.S. Pat. No. 2,854,849, appears to have no positive means of locking the upwardly opening trough-shaped outer receptacle with respect to the elongated smaller receptacle 12. Therefore, it will be difficult to obtain precisely the same measurement each time. The objections to the difficulty in cleaning this measuring scoop to meet the various health requirements will be as strongly made as in connection with any of the other scoops or measuring cups of the prior art.

Applicant has had a preliminary examination made on a forerunner of the present invention, and the patents cited above are all of the patents which were cited in the reporting of that search.

Applicant, and those in privity with her, are aware of no prior art closer than that discussed above; and are aware of no prior art anticipating the claims herein.

SUMMARY OF THE INVENTION

A measuring cup includes an open-ended cylinder having an inner cylindrical surface and a plane flat disc-like upper edge surface perpendicular to the axis of the cylindrical surface; and a metering piston mounted in the cylinder for longitudinal movement and at least limited rotational movement with respect to the cylinder. The metering piston includes an upper, completely cylindrical, measuring disc of diameter to contact the inner cylindrical surface of the cylinder, this disc being provided with a plane, flat upper surface; a lower interrupted cylindrical guide disc in sufficient contacting relation to the inner surface of the cylinder to maintain the upper disc upper face in perpendicular relationship to the axis of the inner cylindrical surface of the cylinder; and means to fixedly space the upper and lower discs from each other, this means being spaced from the inner surface of the cylinder.

The cylinder has a plurality of vertically spaced-apart metering piston positioning lugs extending integrally inwardly from its inner cylindrical surface. The lower guide disc of the metering piston is provided with slots in its outer periphery of size and shape to allow passage of the lower piston disc past the positioning lugs when the piston and cylinder are positioned to vertically align the lugs with the slots.

The lugs are of configuration to prevent longitudinal movement of the piston with respect to the cylinder at least in direction away from the upper edge surface of the cylinder when the slots are not vertically aligned with the lugs.

The lugs are so positioned vertically that when any particular lug is associated with the lower piston disc to prevent longitudinal movement of the piston with respect to the cylinder, the space defined by the upper face of the upper piston disc, the plane of the cylinder upper edge surface and the inner surface of the cylinder defines precisely one of the volumes which the measuring cup was predesigned to measure.

In the form of the invention as shown, the metering piston positioning lugs are illustrated as having a horizontal bar portion designed to contact the lower piston disc 18 to fixedly position it against downward movement when the lugs are not aligned with the slots in the piston guide disc. Also shown as part of the positioning lugs is a J-shape portion extending outwardly from one end of the horizontal bar portion, up and around to provide a space into which a shoulder on the lower disc which partially bounds the slot can enter. This prevents longitudinal movement of the piston with respect to the cylinder in either direction. On the uppermost positioning lug, this J-shape portion is especially useful since it will prevent any tendency of the piston to fall out of the top end of the cylinder when the measuring cup is tipped partially upside down to discharge the measured material from it. The measuring cup of the invention will operate successfully without a J-shape portion on the positioning lugs. In this instance, it will be helpful to have an additional positioning lug just above the uppermost positioning lug as shown in the drawings. Such an additional lug will be in position to prevent all but limited upward movement of the piston through the top end of the cylinder when the measuring cup is being tipped up to get rid of the measured material.

The use of a completely transparent outer cylinder which is firmly and positively locked in relative longitudinal position with respect to the piston is advantageous in measuring such materials as lard inasmuch as the lard can be spooned and pushed into the measuring cup with as much force as necessary to remove any air pockets or air bubbles which form, and these air bubbles, and particularly those which form adjacent to the surface of the cylinder, can be easily seen through the cylinder, and, with more pressure, eliminated. It would be difficult if not impossible to utilize the force required to get rid of all of the air bubbles if the piston and cylinder were not positively locked against downward longitudinal movement of the piston, for example, in the situation where friction between the cylinder and piston had to be relied upon to hold the desired volume in the measuring cup.

Before the present invention, it was often the practice to measure lard by weight rather than by use of a measuring cup. This eliminated the necessity to have to dig the lard out of the measuring cup once it was forced into the cup to measure and to remove any air bubbles. With the present invention, after the lard has filled the measuring cup to the brim, the piston can be rotated with respect to the cylinder to once again align the positioning lugs of the cylinder with the slot in the lower piston disc, and upward pressure on the bottom of the piston while holding the cylinder on a horizontal axis, for example, will result in the lard being slid completely out of the measuring cup. If the lard adheres to the piston, it can easily be dislodged using a spatula after the upper face of the upper piston disc is moved to position at least flush with the upper edge of the cylinder.

BRIEF DESCRIPTION OF THE DRAWINGS

FIG. 1 is an elevational view of a measuring cup made according to the present invention;

FIG. 2 is a top plan view of the measuring cup of FIG. 1;

FIG. 3 is a vertical sectional view taken on the line 3—3 in FIG. 1 and showing a metering piston positioned with respect to an open-ended cylinder of the measuring cup to measure a relatively large amount of material;

FIG. 4 is a vertical sectional view also taken on the line 3—3 in FIG. 1, but showing the metering piston positioned with respect to the cylinder of the measuring cup to measure a lesser amount of material than that shown in FIG. 3;

FIG. 5 is a horizontal sectional view taken on the line 5—5 in FIG. 3;

DETAILED DESCRIPTION OF THE PREFERRED EMBODIMENTS

Figure 6:
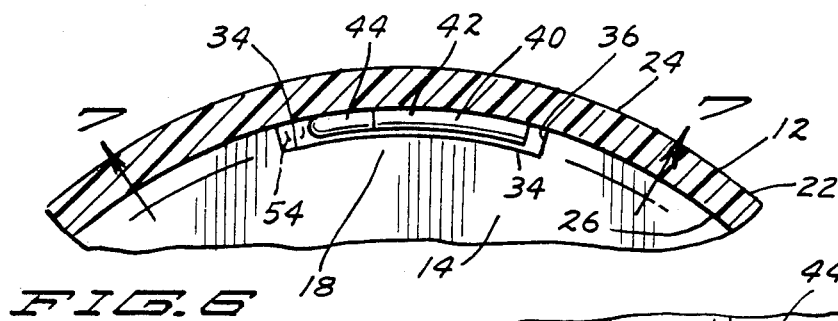
FIG. 6 is an enlarged fragmentary sectional view also taken on the line 5—5 in FIG. 3 and showing a portion of the cylinder and piston of the measuring cup as seen on the left side of FIG. 5.

A measuring cup 10 of the invention includes a transparent open-ended cylinder 12 and a metering piston 14 slidably mounted in that cylinder. The piston 14 includes an upper completely cylindrical disc 16 partially bounded by plane, flat upper surface 17, a lower interrupted cylindrical guide disc 18, and an hourglass-shape body portion 20 integrally joining the upper and lower discs to each other.

The open ended cylinder 12 consists of a wall 22 which is bounded by an outer cylindrical wall surface 24, and inner cylindrical wall surface 26, a plane, flat, discoidal upper edge surface 28, and a lower edge surface 30.

The diameter of the upper completely cylindrical disc 16 of the metering piston 14 and the diameter of the inner cylindrical wall surface 26 of the cylinder 12 is such that the metering piston can slide freely in the cylinder but without sufficient clearance therebetween to allow passage of any substantial portion of the materials to be measured between the wall 22 and the upper disc 16. The maximum outer diameter of the lower interrupted cylindrical guide disc 18 is such that it contacts the inner cylindrical wall surface 26 of the cylinder 12 in sufficient places to maintain the metering piston and primarily the upper surface 17 of the disc 16 of the metering piston in exactly normal relationship to the longitudinal axis of the cylinder 12.

As seen in FIGS. 5 through 10, the lower cylindrical disc 18 is provided with a pair of slots 34, 34 at diametrically opposite sides thereof. Each of these slots is partially bounded by radially outwardly extending shoulder portions 36, 36 of the lower disc 18.

Extending inwardly from the inner cylindrical wall surface 26 of the cylinder 12 and at diametrically opposite sides of the cylinder are metering piston positioning lugs 40. In the form of the invention as shown, these lugs include a horizontal bar portion 42 and a J-shape portion 44 extending integrally away from and upwardly from the bar portion. The outer end of each J-shape portion is provided with a slight protuberance 46.

The metering piston 14, in the form of the invention as shown, is in the form of a complete sealed envelope so that none of the materials to be measured nor any deleterious materials can ever get into the sealed interior of that piston. In order to permit rotation of the piston 14 and movement of it in the longitudinal direction all with respect to the cylinder 12, an indented portion of the cylindrical guide disc 18 is provided with an outstanding finger grip 48.

In alignment with each of the metering piston positioning lugs 40 and clearly visable from the outside of the cylinder 12 are indicia each indicating a quantity of material which can be measured when the lower cylindrical disc 18 is aligned immediately above the horizontal portion 42 of a particular positioning lug 40.

OPERATION

The metering piston 14 assembled inside of the open ended cylinder 12 in position such that each of the metering piston positioning lugs 40 is in longitudinal alignment with one of the slots 34 of the lower interrupted cylindrical guide disc 18. The metering piston 14 will then be moved longitudinally inside of the cylinder 12 until a horizontal bar portion 42 of a positioning lug 40 associated with indicia representing the amount of material to be measured is positioned in alignment with, or, more properly, directly below alignment with the bottom surface of the lower disc 18. Holding the cylinder 12 in one hand and holding the finger grip 48 of the piston, with the other hand, the metering piston 14 will be rotated in direction to cause the shoulder portions 36 partially defining each of the slots 34 to enter into the open part of the J-shaped portion 44 of each of the diametrically opposite positioning lugs 40. Protuberances 46 will bind on diametrically opposed upper surfaces of shoulders 36 of the lower disc 18, tending to resist rotational movement of the metering piston with respect to the cylinder. This will guard against accidental displacement of the two with respect to each other.

Assuming that one cup of shortening, for example, is to be measured, the parts will be initially positioned as seen in FIGS. 1, 5, 6 and 7, and then the metering piston will be rotated with respect to the cylinder to position the parts as seen in FIGS. 8, 9, 10 and 11.

At this point the material to be measured, shortening, for example, will be put into the measuring cup through the open top end of the cylinder 12 past the upper edge surface 28 to completely fill and slightly overfill the one cup of space thus defined, and a spatula or other flat instrument will be moved across the upper edge surface 28 in contact with it to clear away from the measuring cup everything except precisely the measured amount needed.

The measuring cup will then be moved to a mixing bowl or other place where the measured quantity of material is to be discharged, the metering piston will be rotated in opposite direction with respect to the cylinder to once again bring all of the metering piston positioning lugs 40 into register with one or the other of the slots 34 in the lower disc 18, and, tilting the measuring cup and holding it over the mixing bowl, for example, the metering piston will be moved up in the cylinder to bring the upper plane flat surface 17 of the upper disc 16 of the metering piston into the same plane as that of the upper edge surface 28 of the cylinder wall 22. In the form of the invention as shown, if desired, the metering piston can again be rotated to bring the J-shaped portion 44 of the uppermost metering piston positioning lugs 40 into aligned and locked relationship with the lower disc 18, thus holding the surface 17 of the upper disc 16 in the plane of the upper edge 28 of the cylinder wall 22.

Other amounts can be measured by aligning the lower cylindrical disc with other positioning lugs 40. For example, in FIG. 4 the parts are positioned to measure ½ cup of material, and that much material is shown loaded into the cup as it would appear after the spatula had been passed over the upper edge surface 28 of the cylinder wall 22.

The metering piston positioning lugs 40 do not necessarily have to take the shape shown in full lines of the drawings. For example, the lower disc 18 could be provided with a stop lug 50 as seen in dotted lines in FIG. 9, and the J-shape portion could be completely omitted from the point shown by dotted line 52 in FIG. 9, on, out and around to the end. With this structure, after the metering piston 14 has been moved to align a pair of lugs 40 immediately below the surface of the lower disc 18, the piston will be rotated with respect to the cylinder to bring the horizontal bar portions 42 of these lugs 40 each into contact with its own stop lug 50. Then when the material is placed inside of the measuring portion of the cup, that material and gravity will tend to retain the piston at precisely the right position to achieve the proper measurement.

Figure 7:
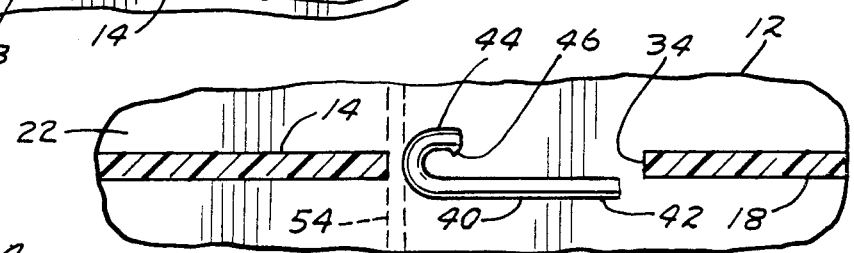
FIG. 7 is a fragmentary sectional view taken on the line 7—7 in FIG. 6.
Figure 8:
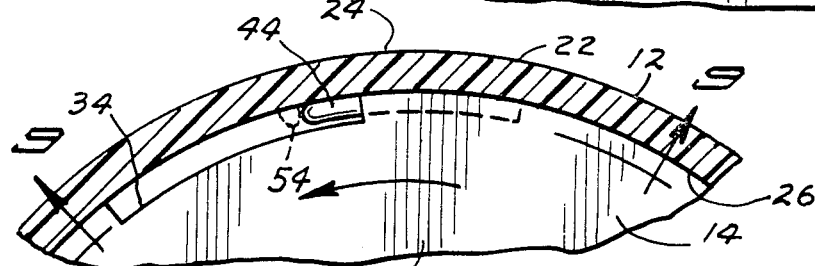
FIG. 8 is a fragmentary sectional view of the parts as seen in FIG. 6, but with the metering piston rotated to be locked against longitudinal movement with respect to the cylinder.
Figure 9:
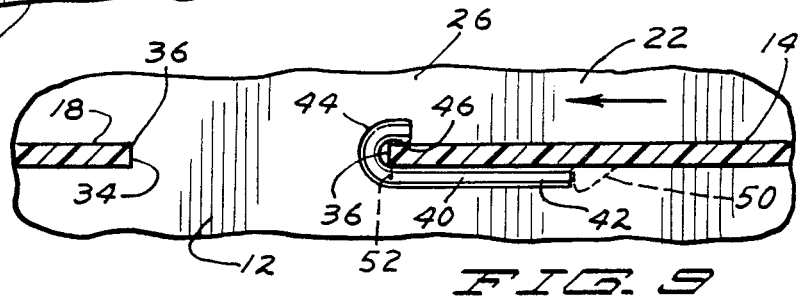
FIG. 9 is a fragmentary vertical sectional view taken on the line 9—9 in FIG. 8.
Figure 10:
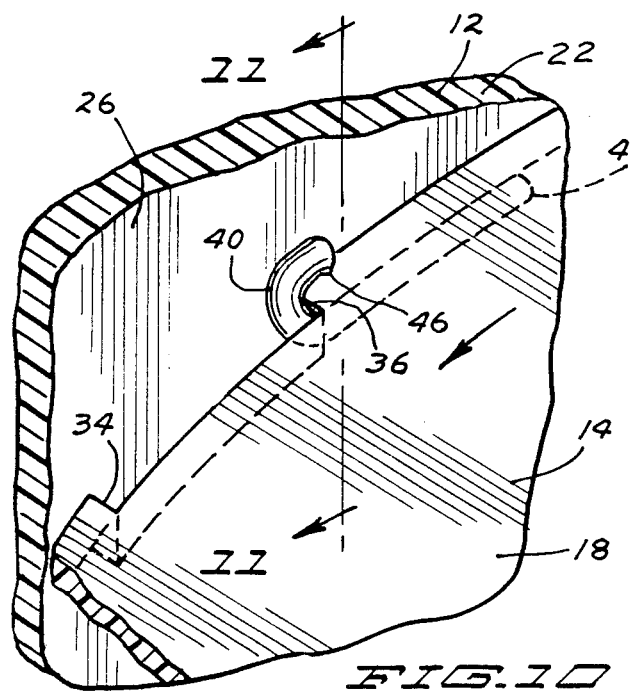
FIG. 10 is an enlarged fragmentary perspective view of portions of the cylinder and piston positioned as seen in FIGS. 8 and 9.
Figure 11:
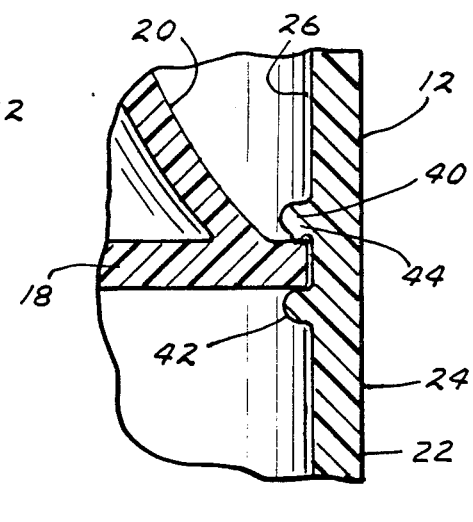
FIG. 11 is a fragmentary vertical sectional view taken on the line 11—11 in FIG. 10.

Further, whether the J-shape portion 44 is utilized or not, and whether the stop lugs 50 are provided or not, a vertical positioning ridge 54 can protrude from the inner cylindrical wall surface 26 as seen in dotted lines at 54 in FIGS. 6, 7 and 8.

With this construction, when the metering piston 14 is put into the open ended cylinder 12, this vertical positioning ridge will have to extend into the space provided by a slot 34 of the lower disc 18. Alignment or registration of these positioning lugs with respect to the slots 34 is accomplished very quickly by rotating the metering piston with respect to the open ended cylinder 12 to cause the shoulder portion of each slot opposite shoulder portion 36 to come up against vertical positioning ridge 54. This will automatically achieve the desired registration between the horizontal positioning lugs 40 and the slots 34. Once the horizontal bar portion 42 of the positioning lug 40 has been properly aligned with respect to the lower disc 18, the piston and cylinder will be rotated with respect to each other to bring the shoulders 36 into contact with a "bottom" of the open J-shape portion 44 in the form of the invention as disclosed in full lines.

In situations where the J-shape portion 44 has been omitted the metering piston and open ended cylinder 12 can be rotated with respect to each other until the shoulder 36 comes in contact with the vertical positioning ridge itself.

Although the present invention has been described with reference to preferred embodiments, workers skilled in the art will recognize that changes may be made in form and detail without departing from the spirit and scope of the invention.

What is claimed is:

1. A measuring cup adjustable to measure a finite number of predetermined volumes of material, said measuring cup including:
   A. an open ended cylinder;
   B. a metering piston mounted in the cylinder for longitudinal movement and at least limited rotational movement with respect to the cylinder;
   C. said cylinder being partially defined by an inner cylindrical surface and a plane, flat, discoidal upper edge surface perpendicular to the axis of the cylindrical surface;
   D. said piston including:
      (1) an upper, completely cylindrical measuring disc of diameter to contact the inner cylindrical surface of the cylinder when installed therein, said upper disc being provided with a plane, flat upper face,
      (2) a lower interrupted cylindrical guide disc in sufficient contacting relation to the inner surface of the cylinder when installed therein to maintain the upper face of the upper measuring disc in normal relation to the axis of the inner cylindrical surface, and
      (3) means to fixedly space said discs from each other, said means being spaced from the inner surface of the cylinder;
   E. said cylinder having a plurality of vertically spaced apart metering piston positioning lugs extending substantially horizontally inwardly from its inner cylindrical surface;
   F. said lower guide disc of said metering piston being provided with slots in its outer periphery of size and shape to allow passage of said lower disc past said positioning lugs when the piston and cylinder are positioned to vertically align the lugs with the slots;
   G. said lugs being of configuration to prevent longitudinal movement of said piston with respect to said cylinder at least in direction away from said cylinder upper edge surface when said slots are not vertically aligned with the lugs; and
   H. each of said lugs being so positioned vertically that when it is associated with the lower piston disc to prevent longitudinal movement of the piston with respect to the cylinder, the space between the upper face of the upper piston disc and the plane of the cylinder upper discoidal edge surface and within the cylindrical wall defines precisely at least one of the volumes which the measuring cup is predesigned to measure by indicia on a surface of said cylinder.

2. The measuring cup of claim 1 wherein:
   I. the positioning lugs each include a horizontal bar portion positioned to lie in supporting relation to the lower piston disc when the upper surface of the upper piston disc and the upper portion of the inner wall surface of the cylinder are defining one of the predetermined volumes to be measured.

3. The measuring cup of claim 2 wherein:
   J. the horizontal bar portion of each positioning lug is provided with a downwardly extending stop lug positioned to arrest rotation of the piston and cylinder relative to each other when the bar portion of the positioning lug has attained a supporting relationship under the lower piston disc.

4. The measuring cup of claim 1 wherein:
   I. at least a portion of the cylinder adjacent each positioning lug is sufficiently transparent to allow the positioning of the lower piston disc with respect to that lug to be viewed through the cylinder wall.

5. The measuring cup of claim 4 wherein:
   J. indicia representative of one of the predetermined volumes is displayed adjacent each positioning lug with which the lower piston must be fixed to provide a cup measure of that volume, said indicia being readable from outside the cylinder.

6. The measuring cup of claim 1 wherein:
   I. the positioning lugs each include a horizontal bar portion positioned to lie in supporting relation to the lower piston disc when the upper surface of the upper piston disc and the upper portion of the inner wall surface of the cylinder are defining one of the predetermined volumes to be measured;
   J. at least a portion of the cylinder adjacent each positioning lug is sufficiently transparent to allow the positioning of the lower piston disc with respect to that lug to be viewed through the cylinder wall;
   K. indicia representative of one of the predetermined volumes is displayed adjacent each positioning lug with which the lower piston must be fixed to provide a cup measure of that volume, said indicia being readable from outside the cylinder; and
   L. the metering piston positioning lugs each include a J-shape portion extending integrally outwardly, upwardly and back from one end of its horizontal bar portion.

7. The measuring cup of claim 6 wherein:
   M. the outer end of the J-shape portion of each positioning lug has a protuberance thereon extending toward the bar portion thereof, the space between the bar portion and the protuberance being slightly less than the thickness of the lower cylinder disc in the area of the slot so that when a shoulder of the lower disc partially defining the slot moves between the protuberance and the bar portion, the positioning lug will grip the shoulder to tend to prevent accidental movement of the piston with respect to the cylinder.

8. The measuring cup of claim 6 wherein:
   M. metering piston alignment means is provided on the cylinder adjacent one end of the positioning lugs to arrest rotation of the piston with respect to the cylinder at a point where each lug is in vertically aligned relation with its lower piston disc slot.

9. The measuring cup of claim 8 wherein:

N. said alignment means is constituted as a vertical positioning ridge extending outwardly from the inner surface of the cylinder.

10. The measuring cup of claim 1 wherein:
I. the positioning lugs are each positioned in parallel, vertical alignment, one above the other, along the inner wall surface of the cylinder.

11. The measuring cup of claim 1 wherein:
I. Each of the positioning lugs is positioned to lie in supporting relation to the lower piston disc when the upper surface of the upper piston disc and the upper portion of the inner wall surface of the cylinder are defining one of the predetermined volumes to be measured; and
K. indicia representative of one of the predetermined volumes is displayed adjacent each positioning lug with which the lower piston must be fixed to provide a cup measure of that volume, said indicia being readable from outside the cylinder.

12. The measuring cup of claim 11 wherein:
L. metering piston alignment means is provided on the cylinder adjacent one end of the positioning lugs to arrest rotation of the piston with respect to the cylinder at a point where each lug is in vertically aligned relation with its lower piston disc slot.

13. The measuring cup of claim 12 wherein:
M. said alignment means is constituted as a vertical positioning ridge extending outwardly from the inner surface of the cylinder.

* * * * *